US006734582B2

(12) United States Patent
Corbett, Jr. et al.

(10) Patent No.: US 6,734,582 B2
(45) Date of Patent: May 11, 2004

(54) LINEAR ACTUATOR USING A ROTATING MOTOR

(75) Inventors: Jesse Vernon Corbett, Jr., Clayton, NC (US); Richard Hunter Harris, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 09/829,888

(22) Filed: Apr. 10, 2001

(65) Prior Publication Data
US 2002/0145341 A1 Oct. 10, 2002

(51) Int. Cl.[7] .................... H02K 41/00; H02K 33/00; H02K 35/00; H02K 7/06
(52) U.S. Cl. ............... 310/12; 310/20; 310/21; 310/27; 310/29
(58) Field of Search ................ 310/12, 20, 21, 310/27, 29

(56) References Cited

U.S. PATENT DOCUMENTS

| | | | | |
|---|---|---|---|---|
| 3,577,023 A | * | 5/1971 | Bleiman .................. | 310/13 |
| 4,238,699 A | * | 12/1980 | Seilly .................... | 310/27 |
| 4,270,502 A | * | 6/1981 | Seilly .................... | 123/357 |
| 4,358,691 A | * | 11/1982 | Naylor ................... | 310/12 |
| 4,393,319 A | | 7/1983 | Bock ..................... | 310/80 |
| 4,394,592 A | * | 7/1983 | Pataki ................... | 310/12 |
| 4,496,865 A | * | 1/1985 | Allen et al. ............. | 310/80 |
| 4,560,894 A | | 12/1985 | Stoll .................... | 310/67 R |
| 4,735,179 A | * | 4/1988 | Ejiri et al. .............. | 123/332 |
| 4,742,322 A | * | 5/1988 | Johnson et al. .......... | 335/272 |
| 4,947,815 A | * | 8/1990 | Peter .................... | 123/399 |
| 5,038,061 A | * | 8/1991 | Olsen ................... | 310/15 |
| 5,039,894 A | * | 8/1991 | Teter et al. ............. | 310/26 |
| 5,053,660 A | * | 10/1991 | Sneddon ................ | 310/80 |
| 5,332,965 A | * | 7/1994 | Wolf et al. ............. | 324/207.12 |
| 5,351,935 A | * | 10/1994 | Miyoshi et al. ......... | 251/129.11 |
| 5,451,824 A | | 9/1995 | Sieber et al. ........... | 310/80 |
| 5,490,487 A | * | 2/1996 | Kato et al. ............. | 123/399 |
| 5,537,275 A | * | 7/1996 | Peace et al. ........... | 360/291.2 |
| 5,554,899 A | * | 9/1996 | Teramachi ............. | 310/80 |
| 5,664,542 A | * | 9/1997 | Kanazawa et al. ...... | 123/361 |
| 5,718,259 A | * | 2/1998 | Miyake et al. ......... | 137/338 |
| 5,735,243 A | * | 4/1998 | Asai et al. ............. | 123/396 |
| 5,777,404 A | * | 7/1998 | Has ..................... | 310/12 |
| 5,778,853 A | * | 7/1998 | Saito ................... | 123/396 |
| 5,796,187 A | | 8/1998 | Nagai et al. ........... | 310/20 |

(List continued on next page.)

FOREIGN PATENT DOCUMENTS

JP          05029134 A   *  2/1993   ........... H01F/07/16

Primary Examiner—Burton S. Mullins
Assistant Examiner—Pedro J. Cuevas
(74) Attorney, Agent, or Firm—Winstead Secrhist &Minick PC; J Bruce Schelkopf (57) ABSTRACT

A linear actuator incorporates a DC motor whose stator is secured to a frame. A shaft is coupled to the rotor of the DC motor one end of which is circumferentially coupled to the inside of a torsion spring and the outer section of the torsion spring is coupled to the frame. The center section of the shaft is circumferentially raised creating first and second shaft stops. The middle of the shaft is threaded and threadedly coupled to a translating actuator which has a radial raised portion which engages a section of the frame. The radial raised section provides a radial stop and prevents the translating actuator from rotating. Additional radial raised portions on the translating actuator create first and second stops that engage the first and second shaft stops at each extreme of travel. The first stop keeps the threads from binding in a retracted position and the second stop keeps the threads from binding in the extended position. The torsion spring stores rotational energy of the motor when it is powered and returns it, reversing the shaft, when power to the motor is removed.

15 Claims, 6 Drawing Sheets

U.S. PATENT DOCUMENTS

| | | | | |
|---|---|---|---|---|
| 5,868,114 A | * | 2/1999 | Kamimura et al. | 123/399 |
| 5,935,071 A | * | 8/1999 | Schneider et al. | 600/445 |
| 5,966,988 A | * | 10/1999 | Aiso et al. | 74/89.34 |
| 5,975,051 A | * | 11/1999 | Yamada et al. | 123/396 |
| 5,979,405 A | * | 11/1999 | Sato et al. | 123/399 |
| 5,997,119 A | * | 12/1999 | Kerr | 346/139 R |
| 6,019,023 A | * | 2/2000 | Betourne | 83/174 |
| 6,129,040 A | * | 10/2000 | Viggiano et al. | 118/323 |
| 6,157,103 A | * | 12/2000 | Ohta et al. | 310/49 R |
| 6,199,856 B1 | * | 3/2001 | Clauser et al. | 271/180 |
| 6,201,364 B1 | * | 3/2001 | Will et al. | 318/466 |
| 6,222,294 B1 | * | 4/2001 | Stacy et al. | 310/112 |
| 6,296,610 B1 | * | 10/2001 | Schneider et al. | 600/445 |
| 6,300,692 B1 | * | 10/2001 | Joyce | 310/26 |
| 6,317,287 B1 | * | 11/2001 | Yano et al. | 360/260 |
| 6,390,062 B1 | * | 5/2002 | Saito et al. | 123/399 |
| 6,433,447 B1 | * | 8/2002 | Kitazawa et al. | 310/12 |
| 6,591,809 B2 | * | 7/2003 | Saito et al. | 123/399 |
| 6,595,172 B2 | * | 7/2003 | Kabasin et al. | 123/90.16 |
| 6,603,228 B1 | * | 8/2003 | Sato | 310/83 |
| 6,603,229 B1 | * | 8/2003 | Toye, IV | 310/90 |
| 6,626,143 B1 | * | 9/2003 | Wayama et al. | 123/399 |

* cited by examiner

LINEAR ACTUATOR USING A ROTATING MOTOR

TECHNICAL FIELD

The present invention relates in general to electro-mechanical devices, and in particular to linear motion actuators.

BACKGROUND INFORMATION

Soleniods are traditionally used to actuate mechanisms by the application of a voltage to an electromagnetic coil. Solenoids are expensive and require considerable design effort to ensure that the mechanical load requirements are consistent with the available force profile of the solenoid. This can be particularly challenging since the solenoid provides less force near the beginning of its stroke and provides exponentially more force as the stroke reaches the end of its travel. Solenoids suffer reliability problems because magnetic flux must bridge the plunger's sliding bearing and a residual magnetic force of close tolerance must prevent the plunger from magnetically sticking to the pole face. If either of these design parameters becomes too marginal, the solenoid performance is radically altered.

Linear actuators have been designed where a motor drives a threaded shaft and a corresponding threadedly coupled nut. The nut translates laterally when prevented from rotating by a guiding surface. The motor may be driven in one direction to emulate the drive stroke of a solenoid and driven in the other direction to return the nut and an attached actuator means to a home position. To define the stroke of the motor driven linear actuator, axial stops have been used which may generate thrust loads in the extended or retracted position. To eliminate driving the motor in both directions, an axial thrust spring has been used with the appropriate thread design to enable the thrust spring to rotate the shaft and translate the nut to a home position. Axial loads may cause motor damage or the threads to bind and thrust return springs, besides causing axial loads, put severe restrictions on the design of the threads to allow a non powered return of an extended actuator.

There is, therefore, a need to have an electrically driven linear actuator device that has neither a sliding bearing nor a requirement for a magnetic residual. There is also a need for a linear actuator that eliminates thrust loads on a drive motor which may bind threads of a linear actuator or reduce motor life. Furthermore, there is a need for the linear actuator device that generates force relatively independent of travel position.

SUMMARY OF THE INVENTION

A low-cost direct current (DC) motor adapted with a threaded shaft is mounted into a reference frame which keeps the DC motor case and thus the stator fixed while the threaded shaft rotates. The threaded shaft is secured to the inner portion of a torsional spring. The outer portion of the torsional spring is secured to the reference frame. A translation actuator is threaded onto the threaded shaft and incorporates a first and a second actuator stop. The threaded shaft has a circular raised portion incorporating a first and a second shaft stop surface. The first actuator stop engages the first shaft stop surface which prevents the translation actuator and the threaded shaft from binding when in a retracted position. The second actuator stop engages the second shaft stop surface and prevents the translation actuator and the threaded shaft from binding when in an extended position. An extension of the translation actuator is operable to contact a mechanical load. The first and second actuator stops define the travel of the translation actuator. The reference frame is adapted with an engaging section that contacts a guide portion of the translation actuator to prevent the translation actuator rotation as the threaded shaft is rotated. The engaging section also guides the translation actuator as it linearly moves. Current supplied to the DC motor windings generates torque, dependent only on current amplitude and the DC motor torque constant. The DC motor torque turns the threaded shaft, loads the torsion spring, and drives the translation actuator which linearly translates and moves the mechanical load. When the current to the DC motor is removed, energy stored in the torsion spring rotates the threaded shaft in the reverse direction until the first actuator stop again engages the first shaft stop surface and prevents the translation actuator and shaft threads from binding.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention maybe practiced without such specific details.

Refer now to the drawings wherein depicted elements are not necessarily shown to scale and wherein like or similar elements are designated by the same reference numeral through the several views.

Figure 1A:
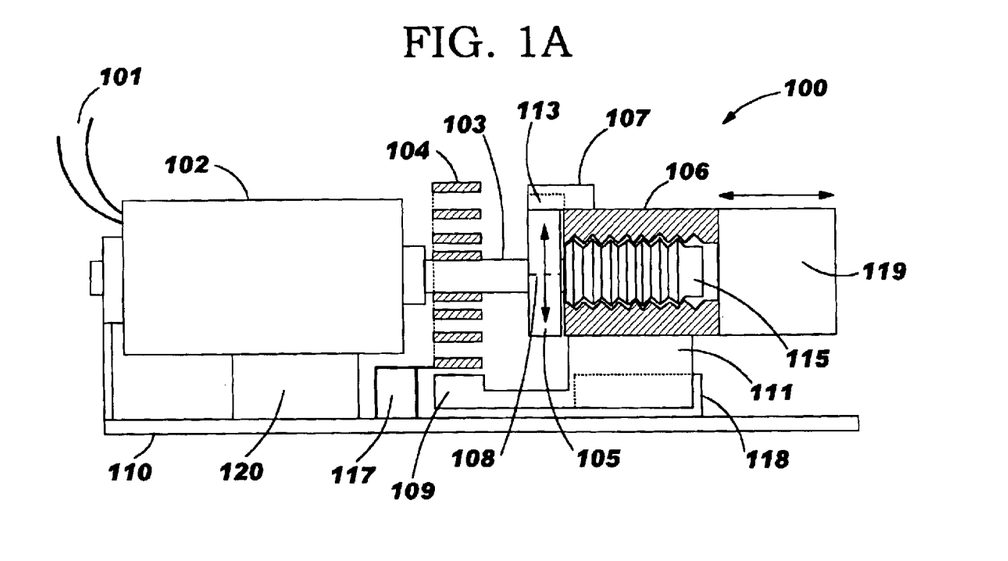
FIG. 1A is a side cross-section view of the DC motor driven linear actuator shown in the retracted position.
Figure 1B:
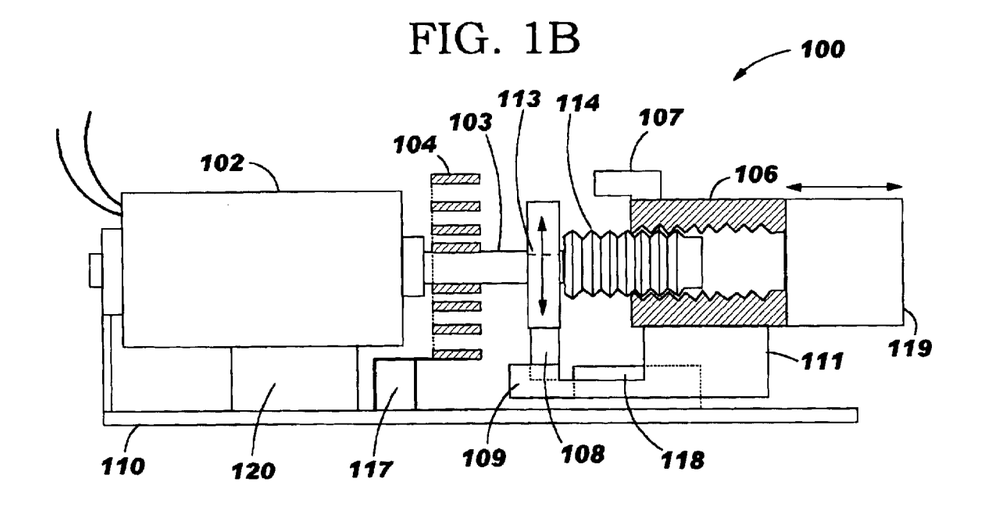
FIG. 1B is a side cross-section view of the DC motor drive linear actuator shown in the extended position.

FIGS. 1A–1B are diagrams of views of elements of a low-cost DC Motor driven linear actuator according to embodiments of the present invention. FIG. 1A is a side cross-section view of the linear actuator where the actuator is in a retracted or home position. The linear actuator 100 has a DC motor 102 as the prime driver. DC motor 102 has a shaft 103 coupled to its rotor (not shown). An inner portion of a torsion spring 104 (see FIGS. 2A–2B) is coupled to shaft 103 and an outer portion of torsion spring 104 is attached to frame 110. As shaft 103 is rotated by motor 102, torsion spring 104 stores rotational energy in one direction which is then returned to shaft 103 causing shaft 103 to rotate in the opposite direction when motor 102 is not driven. Shaft 103 is also coupled to threaded shaft 115. Threaded shaft 115 has a threaded portion 114 (see FIG. 1B) and a raised radial portion, shaft stop 105. Shaft stop 105 has a first shaft stop surface 113 and a second shaft stop surface 108. Threaded shaft 115 is threaded to translation actuator 106. Translation actuator 106 laterally translates if it is prevented from rotating as threaded shaft 115 is rotated. Rotation stop 111, of translation actuator 106, engages a guide section 118 of frame 110 which prevents translation actuator 106 from rotating.

Referring back to FIG. 1A, translation actuator 106 has a first actuator stop 107 and a second actuator stop 109. Actuator stop 107 contacts shaft stop surface 113 (refer to FIGS. 2B and 2C for another view) when the translation actuator 106 is in a retracted position. When translation actuator 106 moves to the right, second actuator stop 109 contacts second shaft stop surface 108. These two stops only generate radial loads to the motor 102 (tangential to a radius of shaft 103) and thus do not cause any binding of the threads 114 of the threaded shaft 115 and the translation actuator 106. An extension 119 of translation actuator 106 may be used to contact and move a mechanical load (refer to FIG. 5). Wires 101 are used to supply power to motor 102 while frame mount 120 secures the motor 102 to frame 110. Frame portion 117 retains the outer portion of torsion spring 104.

FIG. 1B illustrates linear actuator 100 with translation actuator 106 in an extended position and contacting second actuators stop 108. The second shaft stop surface 108 of threaded shaft 105 contacts actuator stop 109 when in the extended position. Translation actuator 106 is extended by applying power (via wires 101) to DC motor 102 and retracted by stored energy in torsion spring 104 via shaft 103 which reverses motor 102 when power is removed from wires 101. The mating threads 114 of translation actuator 106 are also shown in FIG. 1B.

Figure 2A:
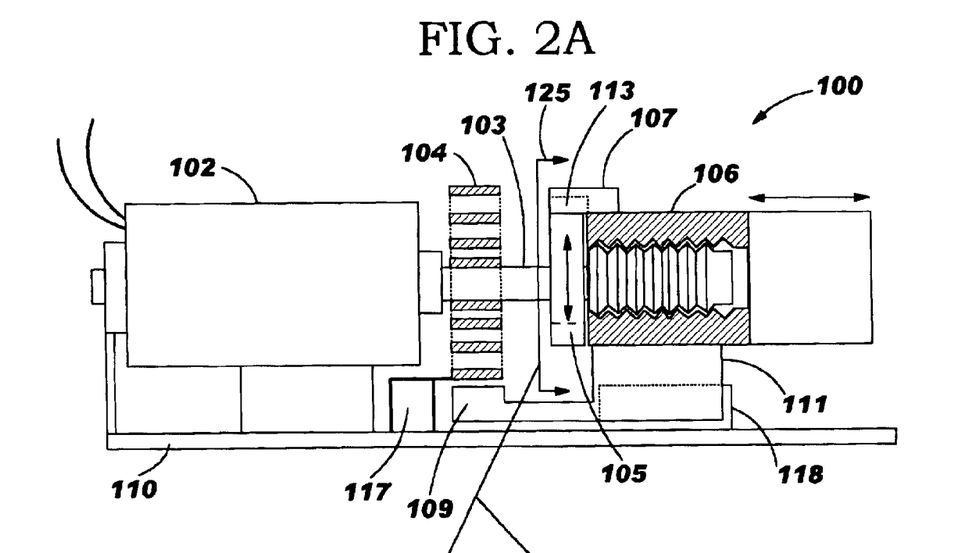
FIG. 2A is a side cross-section view of the DC motor driven linear actuator shown in the retracted position with reference view indicated for FIGS. 2B and 2C.
Figure 2B:
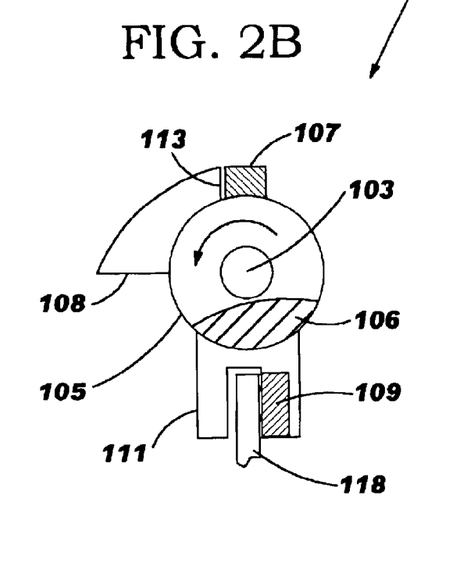
FIG. 2B is a cross-section view of the first actuator stop engaging the first shaft stop surface.
Figure 2C:
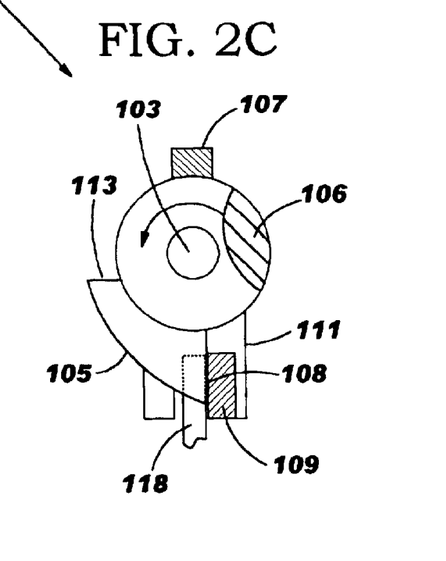
FIG. 2C is a cross-section view of the second actuator stop engaging the second shaft stop surface.

FIG. 2A is a side view of the linear actuator according to embodiments of the present invention used to define the view 125 for FIGS. 2B and 2C. In FIG. 2A, the elements of linear actuator 100 are again detailed. DC motor 102 has shaft 103 coupled to torsion spring 104 which is attached to frame 110 with element 117. View reference 125 defines the view for FIGS. 2B and 2C.

FIG. 2B is an end view 125 of shaft stop 105 and elements of translation actuator 106. First shaft stop surface 113 is shown engaging actuator stop 107 when translation actuator 106 is in the retracted position. Rotation stop 118 is shown in a slot in guide 111. Motor shaft 103 is shown in the center of shaft stop 105. A section of shaft stop 105 is shown removed to view a portion of translation actuator 106.

FIG. 2C is another end view 125 (extended position) of shaft 103 and attached shaft stop 105 rotated to the end of a translation move. In this position, translation actuator 106 has moved to the right and second actuator stop 109 has moved under shaft stop 105 so that it engages second shaft stop surface 108. In this position, the portion of shaft stop 105 with first and second shaft stop surfaces 113 and 108 blocks part of the view of rotation stop 118. Depending on the pitch of the threads 114, it may take multiple revolutions of threaded shaft 115 to move from an engagement of first shaft stop surface 113 with first actuator stop 107 until second shaft stop 108 contacts second actuator stop 109.

Figure 3A:
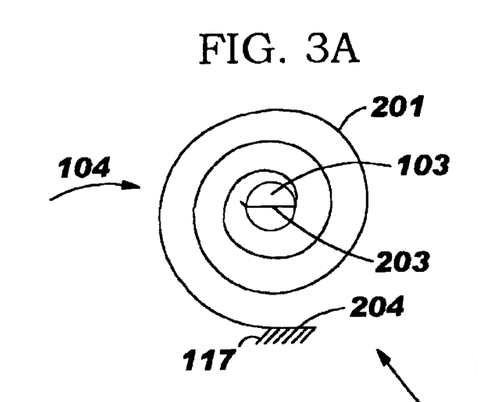
FIG. 3A illustrates the torsion spring in an expanded state.
Figure 3B:
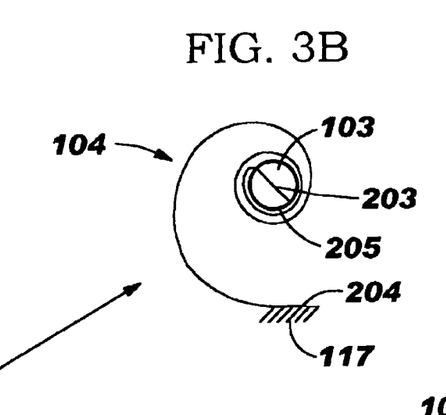
FIG. 3B illustrates the torsion spring in a compressed state.
Figure 3C:
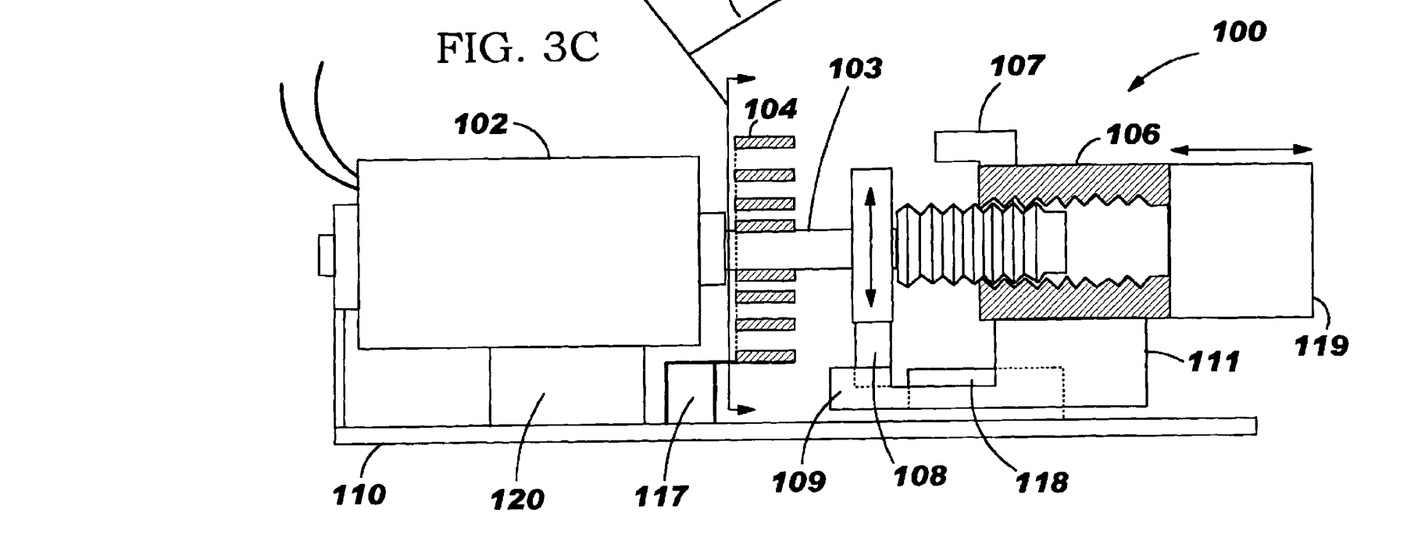
FIG. 3C is a side cross-section view of the linear actuator indicating the views in FIGS. 3A and 3B.

FIGS. 3A and 3B illustrate views of the embodiment in FIG. 1A with the torsion spring shown in an expanded and a compressed state, respectively. FIG. 3C is another side cross-section view of linear actuator 100 with view lines 206 that indicate the cross-section position for the views of torsion spring 104 shown in FIGS. 3A and 3B. FIG. 3A illustrates torsion spring 104 in an expanded position (little or no stored rotational mechanical energy). Torsion spring 104 has an outer portion attachment 204 to frame 110 with element 117 and an inner portion attachment 203 to shaft 103. FIG. 3B illustrates torsion spring 104 in a compressed position with stored rotational mechanical energy. Inner spring portion 205 is shown wound around shaft 103. The torsion spring 104 is in compression in FIG. 3B and corresponds to the illustration in FIG. 3C with translation actuator 106 extended to where second actuator stop 109 contacts second shaft stop surface 108.

In embodiments of the present invention (e.g., FIG. 1A), DC motor 102 is driven by a voltage pulse of sufficient amplitude and duration to generate enough torque to rotate shaft 103 to compress torsion spring 104 and move a mechanical load (see FIG. 6) engaging extended shaft 119. Torsion spring 104 is designed so that its compressed state has enough stored rotational mechanical energy to reverse shaft 103 and return translation actuator 106 so actuator stop 107 contacts shaft stop 113 when the motor drive pulse is removed.

Figure 4A:
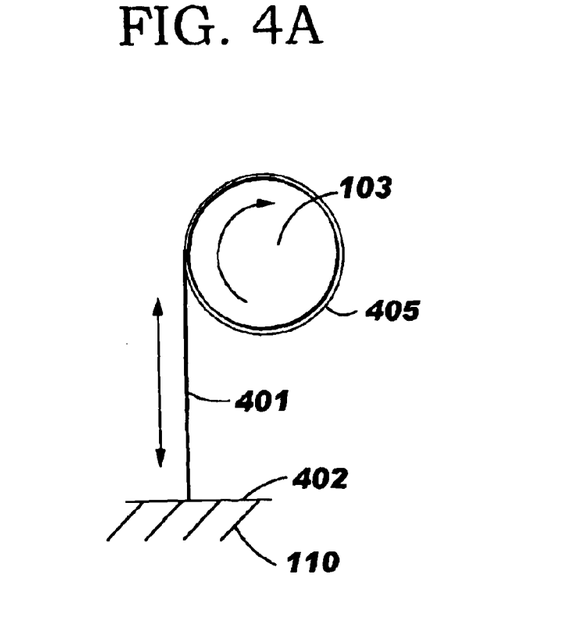
FIGS. 4A and 4B illustrate alternate rotary energy storage means.
Figure 4B:
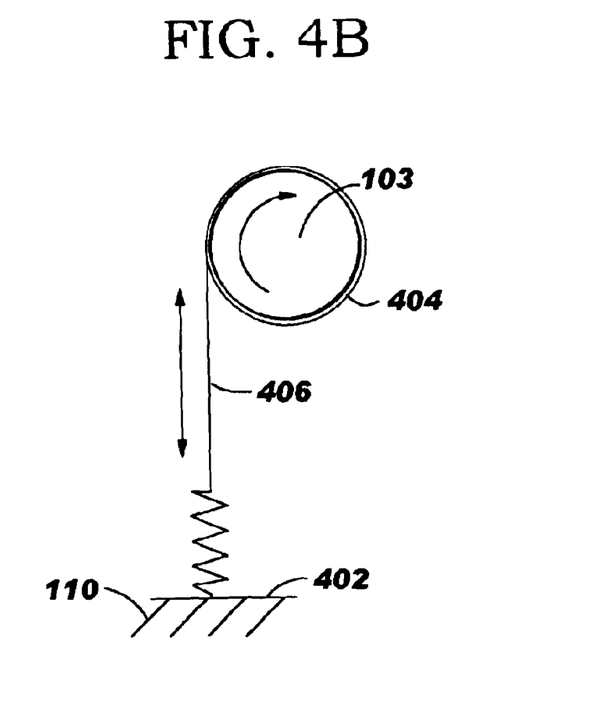

FIGS. 4A and 4B are illustrations of alternate energy storage means for storing rotational energy in a shaft rotated by a DC motor 102. In FIG. 4A, motor shaft 103 has an elastic strip 401 attached to frame 110 with attachment 402. As the motor shaft is rotated elastic strip 401 wraps the shaft 103 with wrap 405 and stretches, thus storing rotational energy. When the motor 102 is de-energized, the elastic strip 401 retracts and returns the stored energy by rotating shaft 103 in the opposite direction. FIG. 4B is another rotational energy storage means according to embodiments of the present invention. Motor shaft 103 has a non-elastic cord 406 attached to a linear spring 403 which is attached to frame 110 with attachment 402. When shaft 103 is rotated, cord 406 wraps the shaft 103 with wrap 404 and elongates linear spring 403 storing energy. When the motor is de-energized, the linear spring 403 retracts and returns the energy by rotating shaft 103 in the opposite direction.

Figure 5:
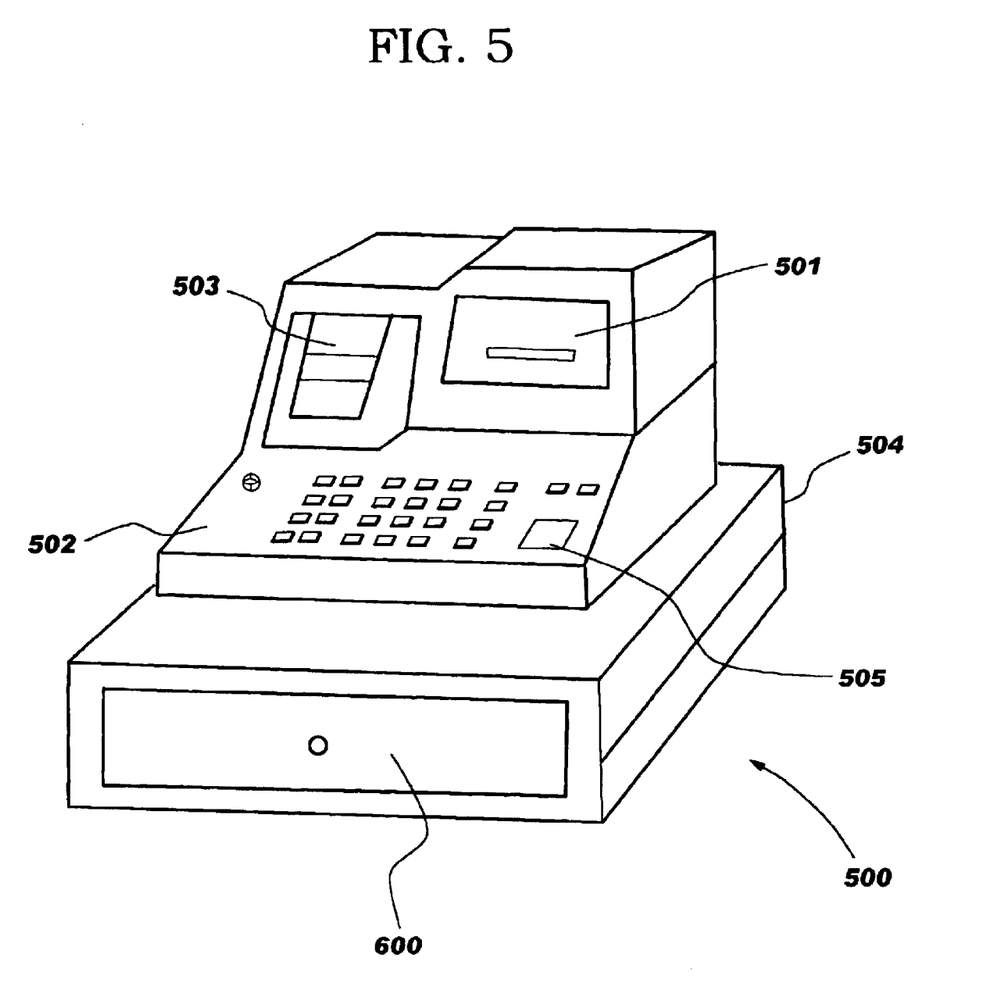
FIG. 5 is an illustration of a point of sales system which may employ a linear actuator according to embodiments of the present invention.

FIG. 5 illustrates a point of sales (POS) terminal 500 which may use a linear actuator 100 according to embodiments of the present invention. POS terminal 500 has a display 501, a key entry unit 502 and a strip printer 503. Housing 504 contains a cash drawer 600. Cash drawer assembly 600 is explained in more detail relative to FIG. 6. Cash drawer 601 (see FIG. 6) opens in response to a key entry (e.g., open key 505) from key entry unit 502. Open key 505 signals an electrical voltage pulse which is applied to a DC motor 102 in a linear actuator 100. Linear actuator 100 acts on a mechanical element to allow cash drawer 601 to open for access.

Figure 6:
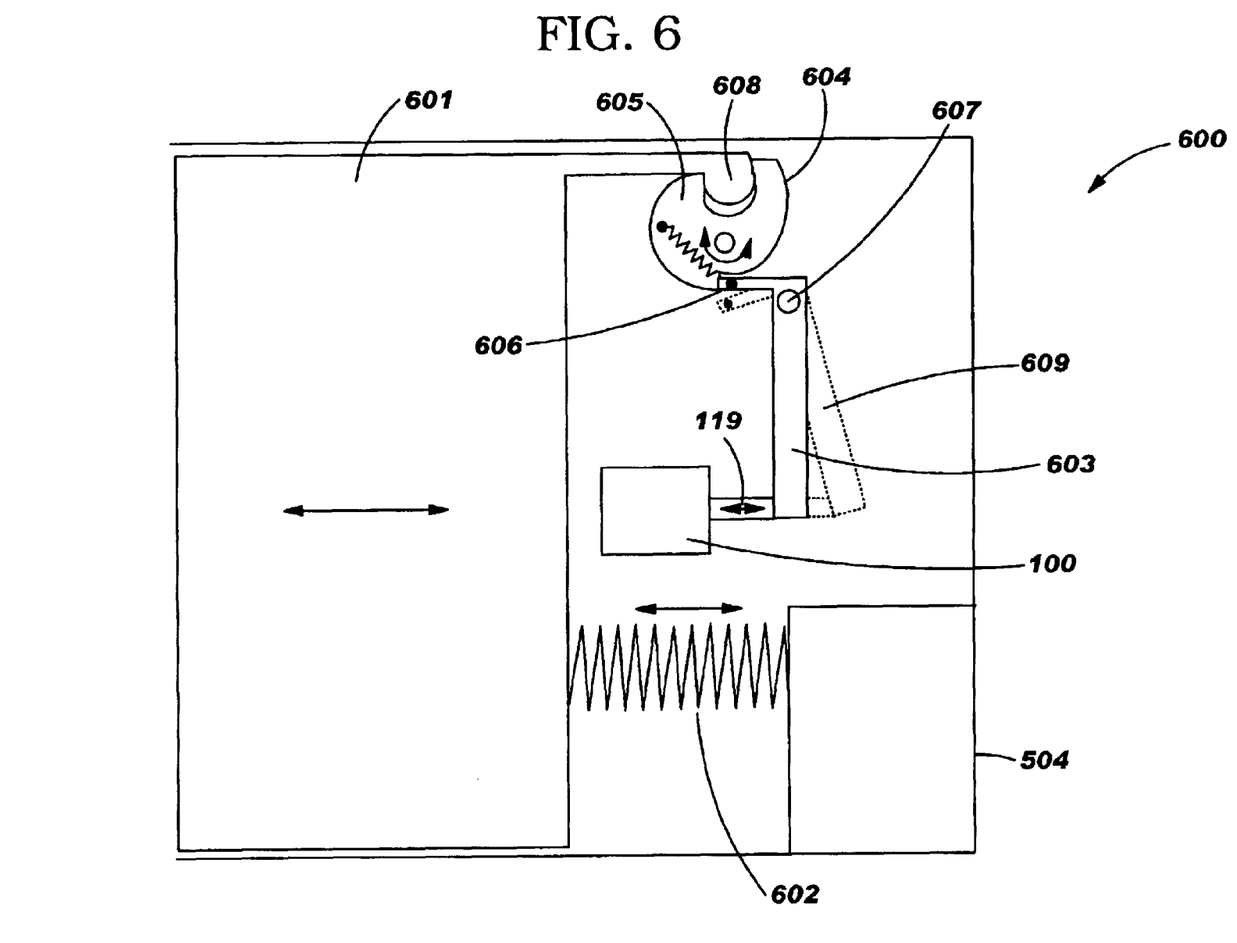
FIG. 6 is a top view of a drawer of a point of sales system employing a linear actuator according to embodiments of the present invention.

FIG. 6 illustrates the details of a cash drawer assembly 600 in an exemplary POS terminal 500. Cash drawer 601 moves laterally in housing 504 on guides (not shown). A propulsion spring 602 is compressed when cash drawer 601 is in the closed position (as shown). A rotary cam 604 engages catch 608 on the cash drawer 601 when cash drawer 601 is closed. Spring 605 is attached to rotary cam 604 and to pawl lever 603. Spring 605 acts to hold pawl lever 603 toward extended shaft 119 of linear actuator 100. A portion of pawl lever 603 also engages ledge 606 of rotary cam 604 and holds it in the shown position when the cash drawer 601 is closed. When open key 505 signals DC motor 102 in linear actuator 100 to move extended shaft 119 (shown by broken line) against pawl lever 603, pawl lever 603 moves to the position 609. This adds further tension to spring 605 as it is extended and causes pawl lever 603 to disengage ledge 606. As rotary cam 604 rotates counterclockwise, it releases catch 608 of cash drawer 601 and propulsion spring 602 moves cash drawer 601 to the left or to an open position. When the voltage pulse is removed from DC motor 102 in linear actuator 100, extended shaft 119 returns by action of the stored energy in torsion spring 104. Since ledge 606 will have rotated past pawl lever 603, pawl lever 603 remains in the position 609. As cash drawer 601 is closed, catch 608 engages rotary cam 604 and rotates it clockwise until ledge 606 clears pawl lever 603 at which time spring 605 rotates pawl lever 603 and again engages ledge 606. Spring 605 keeps ledge 606 engaged with pawl lever 603 thereby retaining cash drawer 601 in a closed position until the cycle is repeated by an actuation of key open 505.

Although the present invention and its advantages have been described in detail, it should be understood that various changes, substitutions and alterations can be made herein without departing from the spirit and scope of the invention as defined by the appended claims.

What is claimed is:

1. A linear actuator comprising:
   a direct current (DC) motor having a stator and a rotor, said stator fixed to a reference frame;
   a threaded shaft coupled to said rotor;
   a torsion spring disposed perpendicular to said axis of said threaded shaft, said torsion spring comprising a center portion coaxially attached to said threaded shaft and an outer portion attached to said reference frame; and
   a translation actuator threadedly coupled to said threaded shaft, said translation actuator rotationally stopped and operable to laterally translate in response to rotation of said threaded shaft by said DC motor.

2. The linear actuator of claim 1, wherein said torsion spring stores rotational energy from DC motor when said DC motor rotates said threaded shaft in a first rotary direction, said torsion spring returning rotational energy to said shaft in a second rotary direction when said DC motor is un-energized.

3. The linear actuator of claim 1, wherein said translation actuator further comprises a portion operable to engage a mechanical load.

4. The linear actuator of claim 1, wherein said threaded shaft is coaxially coupled to a rotational shaft stop, said shaft stop having a first and second shaft stop surface.

5. The linear actuator of claim 4, wherein said translation actuator further comprises a first and a second actuator stop, said first actuator stop contacting said first shaft stop surface in a first translation position and said second actuator stop contacting said second shaft stop surface at a second translation position, wherein a first and second force resulting from said first and second actuator stops contacting said first and second shaft stop surfaces, respectively, act tangential to a radius vector of said threaded shaft.

6. The linear actuator of claim 5, wherein application of a drive voltage pulse to said DC motor drives said linear actuator in a first direction until said second actuator stop contacts said second shaft stop surface and removing said drive voltage pulse releases said stored rotational energy in said torsion spring, said stored rotational energy driving said linear actuator in a second direction until said first actuator stop contacts said first shaft stop surface.

7. A linear translating actuator comprising:
   a direct current (DC) motor having a stator and a rotor, said stator fixed to a reference frame;
   a shaft rotatably coupled to said rotor;
   an energy storing means for storing rotational energy from DC motor when said DC motor rotates said shaft in a first rotary direction, said energy storing means returning rotational energy to said shaft in a second rotary direction when said DC motor is un-energized; and
   a conversion means for converting rotation motion of said shaft to an actuator lateral translation motion.

8. The linear actuator of claim 7, wherein said translation actuator further comprises an end portion operable to engage a mechanical load.

9. The linear actuator of claim 7, wherein said shaft is coaxially coupled to a rotational shaft stop, said shaft stop having a first and a second shaft stop surface.

10. The linear actuator of claim 9, said translation actuator further comprises a first and a second actuator stop, said first actuator stop contacting said first shaft stop surface in a first translation position and said second actuator stop contacting said second shaft stop surface at a second translation position, wherein a first and second force resulting from said first and second actuator stops contacting said first and second shaft stop surfaces, respectively, act tangential to a radius vector of said threaded shaft.

11. The linear actuator of claim 10, wherein application of a drive voltage pulse to said DC motor drives said linear actuator until said second actuator stop contacts said second shaft stop surface and removing said drive voltage pulse releases said stored rotational energy in said torsion spring, said stored rotational energy driving said linear actuator until said first actuator contacts said first shaft stop surface.

12. The linear actuator of claim of claim 7, wherein said energy storage means comprises a torsion spring, wherein a center portion of said torsion spring is coaxially coupled to said shaft and an outer portion of said torsion spring is coupled to said reference frame.

13. The linear actuator of claim of claim 7, wherein said energy storage means comprises a elastic strip having a first and a second end, said elastic strip fixed to said frame at said first end and to said shaft at said second end, said elastic strip wrapping said shaft when said shaft is rotated in said first rotation direction, said elastic strip stretching and thus storing energy.

14. The linear actuator of claim of claim 7, wherein said energy storage means comprises a linear spring having a first end and a second end, said linear spring fixed to said frame at said first end and fixed to a inelastic cord at said second end, said inelastic cord wrapping said shaft when said shaft is rotated in said first rotation direction extending said linear spring, said linear spring elongating thus storing energy.

15. The linear actuator of claim 7, wherein said conversion means comprises a threaded screw member coupled to said shaft and a rotationally retained actuator, said actuator threadedly coupled to said threaded screw member.

* * * * *